Aug. 20, 1935.                J. W. DAWSON                2,011,970
CONTROL SYSTEM
Filed Sept. 30, 1932            2 Sheets-Sheet 1
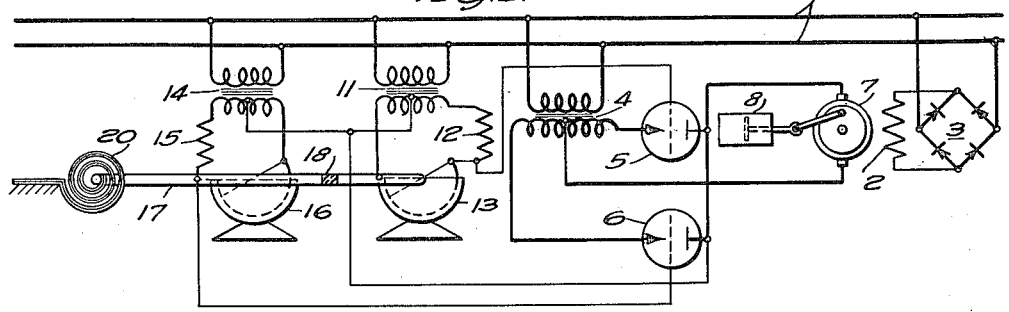
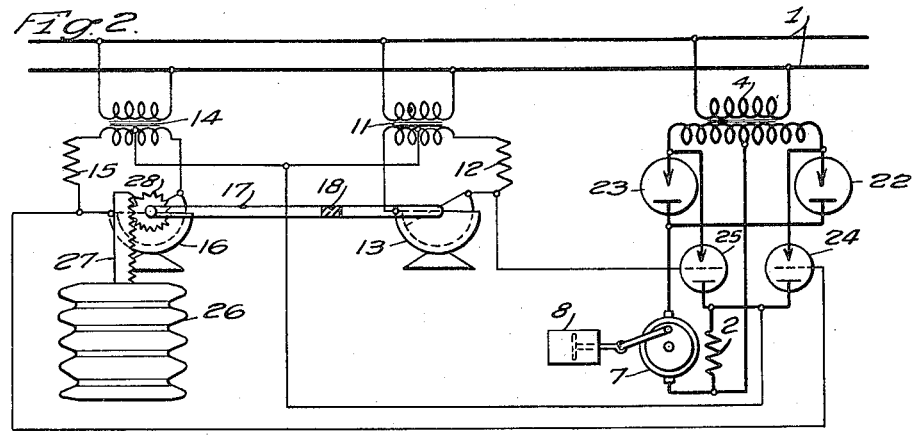
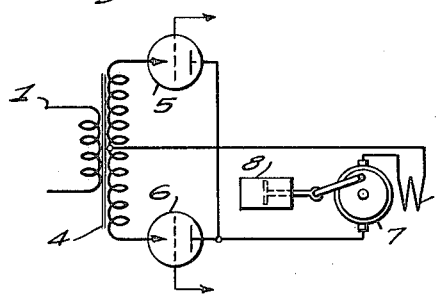
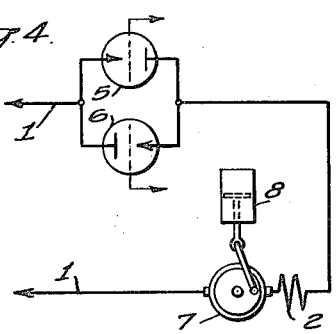
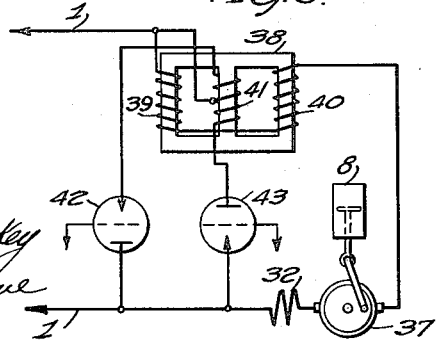
WITNESSES:
E. A. McCloskey
Ohio C. Groove
INVENTOR
John W. Dawson.
BY F. W. Lyle.
ATTORNEY Aug. 20, 1935.   J. W. DAWSON   2,011,970
CONTROL SYSTEM
Filed Sept. 30, 1932   2 Sheets-Sheet 2

WITNESSES:
E. A. M'Closkey.
Wm. C. Groome

INVENTOR
John W. Dawson.
BY F. W. Lyle.
ATTORNEY

Patented Aug. 20, 1935

2,011,970

UNITED STATES PATENT OFFICE 2,011,970

CONTROL SYSTEM

John W. Dawson, Wilkinsburg, Pa., assignor to Westinghouse Electric & Manufacturing Company, East Pittsburgh, Pa., a corporation of Pennsylvania Application September 30, 1932, Serial No. 635,523

6 Claims. (Cl. 236—74)

This invention relates to the control of systems for heat transfer. More specifically, it relates to the system of control in which the supply of energy to the motor driving the compressor is controlled in accordance with the difference between the actual temperature and the desired temperature.

A power-driven compressor may be used to cool a region, as in the usual mechanical refrigerator, or it may be used to increase the temperature of a region, as in the case of the so-called "reverse refrigeration". In either case, the compressor must work faster when the temperature of the space in question is farther from the intended temperature. For example, if a refrigerator is much warmer than it should be, the compressor must be worked more rapidly in order to bring the refrigerator to the desired temperature within a reasonable time. Again, if the refrigerator being warmer than intended indicates that leakage of heat into the refrigerator has occurred faster than removal of heat from the refrigerator by the compressor, the remedy is to increase the activity of the compressor.

It has been usual to stop and start the compressor at appropriate times by a thermostat in the region. If the refrigerator food chamber, for example, is too warm, the thermostat starts the compressor and, if too cool, stops it. There must result a fluctuation in the temperature of the controlled space which is less desirable than a steady maintenance of the desired temperature. If the speed of the compressor be regulated in accordance with the temperature in the controlled space, instead of being stopped and started, a much more nearly steady temperature may be maintained.

It is an object of my invention to control the speed of a motor driving a compressor in accordance with the temperature controlled by the compressor, avoiding discontinuities in the control such as would result in stopping and starting, or abruptly changing the speed of the motor.

It is a further object of my invention to control the current delivered to the compressor motor by thermally-responsive devices acting to control the phase of the grid potential in control tubes.

It is a further object of my invention to control the speed of the compressor motor by means of grid-controlled tubes inserted between the power supply and a winding controlling the speed of the motor. This winding may be either a winding of the motor itself, or another winding influencing the motor speed.

The structure employed in various embodiments of my invention will be apparent from the following description and the accompanying drawings, in which:

Figure 1 is a diagram of circuits and apparatus employed in one embodiment of my invention;

Fig. 2 is a similar diagram for another embodiment thereof;

Fig. 3 is a diagram illustrating another circuit for connecting the power supply to the motor;

Fig. 4 is a similar diagram illustrating another modification of such connection;

Fig. 5 is a similar diagram illustrating still another system of such connection;

Figure 6:
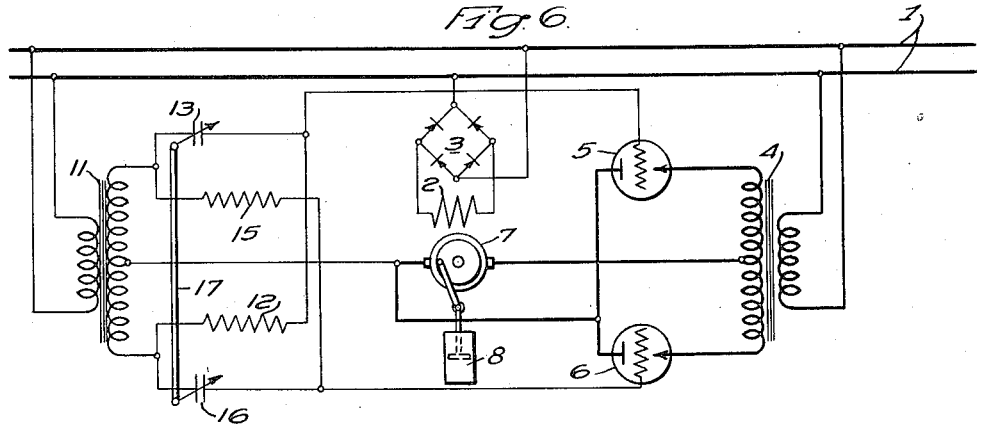
Fig. 6 is a diagram of circuits and apparatus embodying another embodiment of my invention.

In Fig. 1, the power line 1 supplies the field 2 of a direct current motor through any suitable rectifying device, a rectifying bridge 3 being chosen for illustration. The line 1 supplies power through a transformer 4 and two grid-controlled rectifying tubes 5 and 6, which are connected to the secondary of the transformer 4 in the manner of a full-wave rectifier. The output of this rectifier is delivered to the armature 7 of the motor which drives a compressor 8.

Each of the tubes 5 and 6 is equipped with a grid, and potential is delivered to the grid of the tube 5 from a transformer 11 through a circuit including a resistor 12 and a condenser 13. The connection to the grid of the tube 5 is from a point in this circuit between the resistor 12 and the condenser 13. Similarly, a transformer 14, resistor 15 and condenser 16 supply potential to the grid of the tube 6 which is connected to the junction of condenser 16 and resistor 15. The return connection is from the cathodes of the several tubes to the center-points of the transformers 11 and 14.

The condensers 13 and 16 are adjustable. The moving members thereof are mechanically connected together by a shaft 17, but insulated from each other as indicated at 18. A bimetallic spiral 20 is attached to the shaft 17 at any convenient point thereof. The condensers 13 and 16 are located wherever convenient, but the bimetallic member 20 must be inside of the region which is cooled or heated by the action of the compressor 8.

In that form of my invention illustrated in Fig.

2, the power line 1 supplies the transformer 4 which delivers power to a full-wave rectifier comprising the tubes 22 and 23. The output from this rectifier is through the armature 7 of a motor driving a compressor 8. The field 2 of the motor is supplied from the same transformer through a rectifier comprising two grid-controlled tubes 24 and 25.

The power line 1 also supplies two transformers 11 and 14, the circuit supplied by the transformer 11 including a resistor 12 and a condenser 13 and the grid of the tube 25 being connected to a point between them. The circuit supplied by the transformer 14 includes a resistor 15 and a condenser 16, a point between resistor 15 and condenser 16 being connected to the grid of the tube 24. The moving parts of condensers 13 and 15 are connected by shaft 17, but insulated from each other, as indicated at 18.

A thermally-responsive device of the vapor-pressure type, including an elastic bellows 26, is situated as explained in connection with the bi-metallic spiral 20 and is mechanically connected with the shaft 17 in any suitable way. In the way chosen for illustration, a rack 27, connected to the bellows 26, meshes with a pinion 28, fixed to the shaft 17.

In the circuit illustrated in Fig. 3, the line 1 supplies a transformer 4 which is connected to a full-wave rectifier, including grid-controlled tubes 5 and 6. The output of this rectifier is delivered in series to the field 2 and the armature 7 of a motor driving the compressor 8.

In the circuit illustrated in Fig. 4 the line 1 is connected directly to a series motor including a field 2 and an armature 7, without the intervention of any transformer. The current from the line 1 is rectified by a full-wave rectifier including grid-controlled tubes 5 and 6.

In the form illustrated in Fig. 5 the motor including a field 32 and an armature 37 is a commutator type of alternating-current motor, and the current delivered thereto from the line 1 is not rectified. A reactor in circuit between the line and the motor comprises an iron core 38 and coils 39 and 40 thereon, connected in series. The core 38 includes a central leg upon which a coil 41 is mounted. A center tap of this coil is connected to the line 1 and the two ends of the coil are connected respectively to grid-controlled tubes 42 and 43.

The form of thermally-responsive device illustrated in Fig. 1 may be applied in Fig. 2, and that illustrated in Fig. 2 may be applied in Fig. 1, without change of any other portion of either modification. The provision for supplying potential to the grids of the grid-controlled tubes shown in either Fig. 1 or Fig. 2 may be applied to control the grids of the grid-controlled tubes in Fig. 3. It has been deemed unnecessary to repeat the illustration.

To supply the grid potentials for circuits in which the rectifier tubes are relatively reversed or as shown in Figs. 4 and 5 a further modification of the potential supplying circuit is necessary which will be explained in connection with Figs. 7 and 8.

In Fig. 6 is illustrated a circuit for supplying the grid potentials in which a single transformer for supplying the two grid-controlling circuits is sufficient. The line 1 energizes a transformer 11. The secondary of the transformer 11 is connected to a circuit including resistor 12 and condenser 13 in series and is connected also to a circuit in parallel with that just described and comprising a condenser 16 and a resistor 15 in series. From one end of the secondary the current flows over one circuit first through a resistor and then through a condenser, while over the other circuit it flows from the same end of the secondary, first through a condenser and then through a resistor.

The junction point between the resistor 12 and the condenser 13 is connected to the grid of the tube 5 and the junction point between the resistor 15 and the condenser 16 is connected to the grid of the tube 6. The condensers 13 and 16 are adjustable and a mechanical connection indicated in Fig. 6 by the link 17 insures their being adjusted together. The tubes 5 and 6 are shown in a circuit controlling a motor as in Fig. 1, but except for a slight change needed when the grid controlled tubes are in mutual reversed direction as in Figs. 4 and 5. The method of producing grid potential illustrated by Fig. 6 may be applied to any of the motor energizing circuits.

Figure 7:
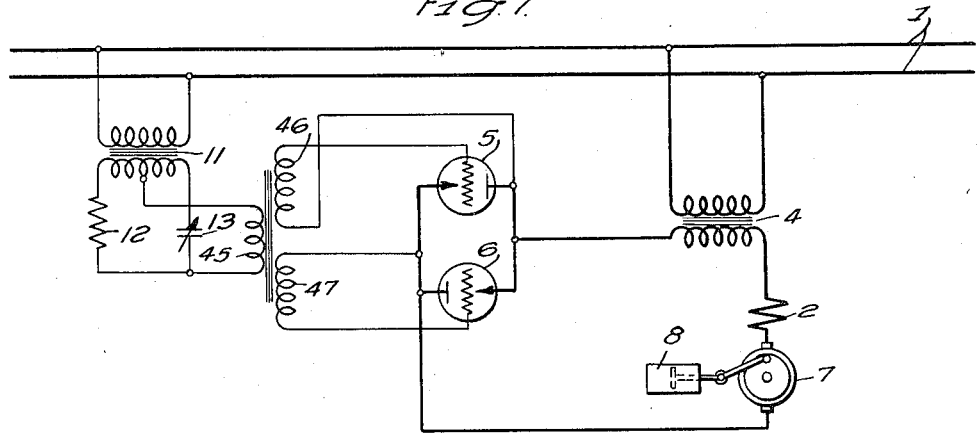
Fig. 7 is a similar diagram for still another embodiment.

In Fig. 7 I have shown an arrangement in which a single condenser will serve for controlling two grids. In this figure the line 1 energizes the transformer 11, in the secondary circuit of which is included a resistor 12 and a condenser 13. The primary 45 of an additional transformer is connected between the midpoint of the secondary of transformer 11 and the junction point of resistor 12 and condenser 13.

The primary 45 is associated with two secondaries 46 and 47. The secondary 46 is connected between the grid and the cathode of the tube 5 and the secondary of the transformer 47 is connected between the grid and the cathode of the tube 6.

In Fig. 7 this method of supplying grid potentials is shown as applied to the circuit shown in Fig. 4 but it is evident that the same method of supplying grid potential can be used in connection with any motor circuit in which the cathode of one tube and the anode of the other tube are directly connected together as they are in Figs. 4 and 5.

Only a very slight modification of the method shown in Fig. 7 is needed when the grid controlled tubes are connected in the motor supply circuit as in Figs. 1, 2 and 3, that is, when the two cathodes are directly connected to each other.

Figure 8:
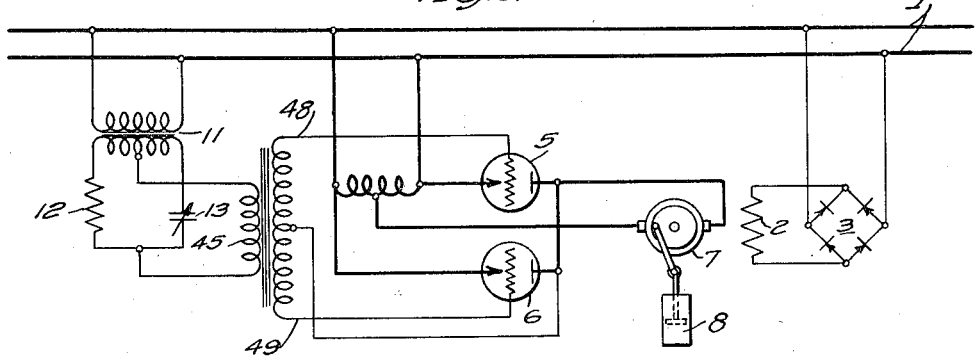
Fig. 8 is a similar diagram showing a modification of the circuit illustrated in Fig. 7.

In Fig. 8 the line 1 supplies a transformer 11 which feeds a circuit including a condenser 13 and a resistor 12. The primary 45 is connected between the midpoint of the secondary of transformer 11 and the junction point of resistor 12 of the condenser 13, all as already explained in connection with Fig. 7. A single secondary is associated with the primary 45. One terminal 48 of this secondary is connected to the grid of a grid-controlled tube 5 and the other terminal 49 of said secondary is connected to the grid of the tube 6. The cathodes of tubes 5 and 6 are connected together and to the middle point of the secondary.

Although in Fig. 8 the tubes 5 and 6 are shown in a motor circuit like that shown in Fig. 1, the method of supplying grid potential illustrated in this figure is applicable to any motor supply circuit in which the tubes have this relation. Such circuits are shown in Figs. 1, 2 and 3.

In the operation of the device the motor 7 drives the compressor 8 which effects a cooling of the region including the bimetallic element 20, or, if the system is to be used in connection with reverse refrigeration, the compressor heats the region including the bimetallic element 20. With change of temperature the bimetallic element 20 curls up or uncurls and thereby rotates the shaft 17, which causes a change in the adjustment of condensers 13 and 16, by which the potentials delivered to the grids of tubes 5 and 6 are changed.

In the case of the refrigerator, if the cooled chamber is too warm, the change in phase is such as to diminish the lag of the potentials upon the grids with the result that more current is delivered to the armature 7 and the compressor is worked faster, thus cooling the refrigerator chamber more rapidly. As the refrigerator chamber cools the adjustment of the condensers 13 and 16 is altered in such a direction that the lag of the potentials upon the grids of tubes 5 and 6 is increased. This diminishes the current supplied to the armature 7 and thereby causes the compressor to be driven at a slower speed. The compressor is thus automatically brought to that speed at which it will just compensate for the leakage of heat into the refrigerator chamber.

An analogous correlation of the several movements for reverse refrigeration may be made in which if the temperature produced in the heated region is too great the lag of the grid potentials will be increased. The compressor, therefore, slows down, which retardation will continue until the region which was too warm has cooled to the desired point. The cooling action is accompanied by a movement of the bimetallic member and a corresponding change in the phase of the grid potentials which will bring the compressor to normal speed when the temperature is at its normal value.

In the system shown in Fig. 2, the action is similar. As the temperature increases the bellows 26 expands, with the result that the condensers are adjusted in the direction needed to correct the speed of the compressor. A similar explanation applies to Figs. 3 and 4, and it is believed that repetition thereof is not needed.

In Fig. 5, when the lag of the grid potential upon tubes 42 and 43 is increased a smaller current flows through the coil 41. The flux in the core 38 is thereby diminished and the iron within the coils 39 and 40 is farther from saturation. The reactance of these coils is thereby increased; the current drop through them is thus increased, and potential impressed upon the motor diminished. The motor, therefore, slows down. Similarly, if the lag of the potential delivered to the grids of the tubes 42 and 43 be diminished, the motor 37 will go faster.

The effect of adjusting the single condenser in Figs. 7 or 8 and the two condensers in Fig. 6 is obvious from the explanation just given and need not be repeated.

Many modifications of my invention besides those illustrated will occur to people skilled in the art. The specific illustration of a few forms only of the embodiment of my invention is not to be interpreted as a limitation. No limitation is intended unless required by the prior art or indicated in the accompanying claims.

I claim as my invention:

1. A heat-transferring apparatus, a motor for operating the same, a circuit for supplying said motor, a grid-controlled space-current device for controlling the current in said circuit in accordance with the phase of the potential supplied to the grid, means for supplying potential to the grid including a reactor controlling the phase of said potential and temperature-controlled means for adjusting said reactor, said temperature-controlled means being in the region affected by said heat-transferring apparatus whereby the operation of said apparatus is controlled in accordance with the temperature of the region affected thereby.

2. In combination, a source of alternating current a full-wave rectifier energized from said source and comprising grid-controlled tubes, a motor, means whereby the rectified current determines the speed of said motor and a device controlling the phase of the grid potentials and thereby controlling the speed of the motor, a heat-transfer device driven by said motor, a temperature-responsive device subjected to the temperature affected by said heat-transfer device and actuating said phase-controlling device.

3. In combination, a compressor, a motor driving said compressor, a supply circuit for said motor, a rectifier tube included in said circuit and having a control grid, a network including an adjustable condenser, means for impressing a potential through said network upon said grid, the phase of said potential being controlled by the adjustment of said condenser, and means controlled by the demand upon said compressor for adjusting said condenser.

4. In combination, a transformer comprising a secondary winding having terminal taps and an intermediate tap, a network comprising a capacitor and a resistor connected in series, means for connecting the terminals of said network to the terminal taps of said transformer and temperature responsive means for continuously varying the capacity of said capacitor.

5. In combination, a power source having terminal taps and an intermediate tap, a network comprising two impedance elements connected in series with each other, said elements being of the type that when a potential is impressed across the network, the potential drop across one element is out-of-phase with the potential drop across the other element, means for connecting the terminals of said network to the terminal taps of said transformer and temperature-responsive means for continuously varying the impedance of one of said elements.

6. In combination, a full wave rectifier comprising grid-controlled tubes, an energy translating device, means whereby the rectified current determines the operation of the energy translating device, a device controlling the phase of the grid potentials and thereby controlling the operation of the energy translating device and a temperature responsive device subjected to the temperature affected by the energy translating device and actuating said phase controlling device.

JOHN W. DAWSON.